United States Patent [19]
Conte

[11] 3,948,411
[45] Apr. 6, 1976

[54] LIQUEFIED GAS CONTAINER

[75] Inventor: Rolland R. Conte, Bourdonne, Conde, France

[73] Assignee: Beatrice Foods Co., Chicago, Ill.

[22] Filed: Mar. 18, 1974

[21] Appl. No.: 452,112

Related U.S. Application Data

[62] Division of Ser. No. 314,136, Dec. 11, 9172, Pat. No. 3,866,758.

[52] U.S. Cl. ............... 220/9 LG; 220/9 D; 220/14; 220/15
[51] Int. Cl.² ................. B65D 25/18; B65D 81/38
[58] Field of Search .......... 220/9 C, 9 D, 9 LG, 10, 220/14, 15; 62/50, 51, 54, 55

[56] References Cited
UNITED STATES PATENTS

| | | | |
|---|---|---|---|
| 2,807,143 | 9/1957 | Schnellhardt................. | 220/9 LG X |
| 3,069,045 | 12/1962 | Haumann et al. .................... | 220/15 |
| 3,119,238 | 1/1964 | Chamberlain et al. ........ | 220/9 LG X |
| 3,272,374 | 9/1966 | Loueday et al................ | 220/9 LG X |
| 3,358,463 | 12/1967 | Hawkins et al................ | 220/9 LG X |
| 3,399,691 | 9/1968 | Schoch et al. ....................... | 62/55 X |
| 3,446,387 | 5/1969 | Webb................................... | 220/14 |
| 3,613,934 | 10/1971 | Leonard................................ | 220/14 |

FOREIGN PATENTS OR APPLICATIONS

| | | | |
|---|---|---|---|
| 208,047 | 10/1966 | Sweden................................ | 220/14 |
| 444,894 | 2/1968 | Switzerland............................ | 62/55 |
| 1,187,649 | 2/1965 | Germany.............................. | 220/9 C |
| 2,018,082 | 11/1971 | Germany........................... | 220/9 LG |

Primary Examiner—William Price
Assistant Examiner—Stephen Marcus
Attorney, Agent, or Firm—McDougall, Hersh & Scott

[57] ABSTRACT

A double walled liquefied gas container formed with an inner storage vessel and a spaced outer shell with insulation in between with a low heat conductive neck tube connecting the access opening of the inner vessel with the access opening through the outer shell with heat conductive ring members preassembled in conductive relation longitudinally spaced along the neck tube and disc members of larger dimension joined in contacting relation with the outer end portions of the ring members and in which the insulation includes layers of heat conductive material wrapped in contacting relation with the disc members and which includes means for connecting the neck tube to the access opening in the outer shell to permit relative angular and lengthwise movement between the inner vessel and outer shell and to limit relative rotational movement.

9 Claims, 5 Drawing Figures

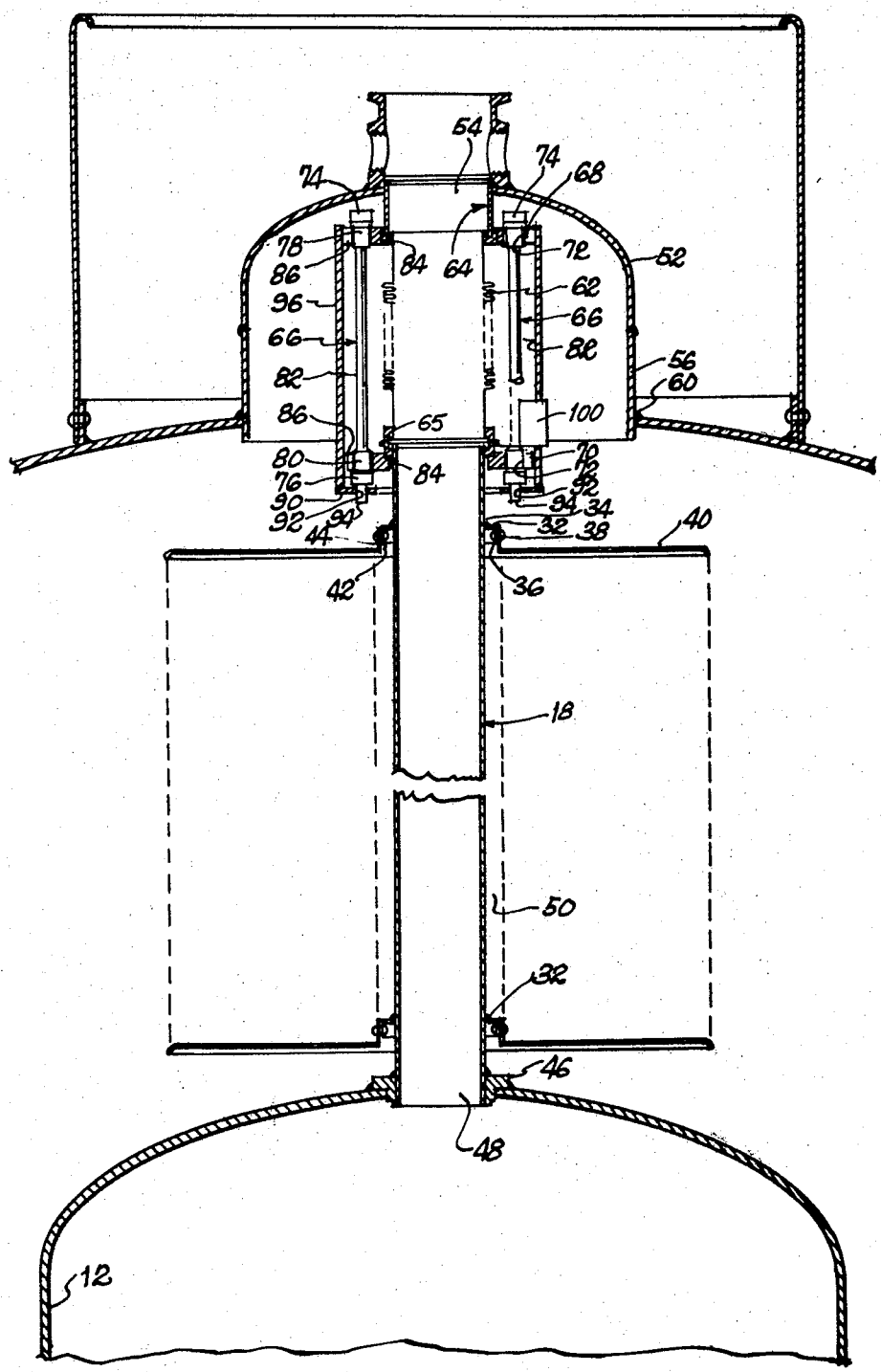

LIQUEFIED GAS CONTAINER

This is a division of the copending application Ser. No. 314,136, filed Dec. 11, 1972, now U.S. Pat. No. 3,866,758.

This invention relates to a double-walled container having an evacuated space in between which is adapted to be provided with a thermal insulating system including insulation material, reflective barrier layers and heat conductive shields, and it relates more particularly to an insulated container of the type described which is adapted for use with material having a temperature that differs widely from the temperature adjacent the outer wall of the container.

While the invention will be described with reference to a container adapted to house a low boiling liquefied gas, such as helium, neon, hydrogen and the like, it will be understood that the container of this invention finds equal use in the storage and transportation of other low boiling liquefied gases such as liquefied oxygen, nitrogen, methane, LNG, ammonia and the like, or for use with fluids at high temperature, such as in the storage or transportation of molten metal or in the housing of sodium or potassium for power cell conversion and the like.

Many types of insulated containers have been proposed for storage and transportation of low boiling liquefied gases. In general, as described in the Matsch U.S. Pat. Nos. 3,007,596; 3,009,600 and 3,009,601, such containers are formed with an inner vessel for housing the liquefied gas and an outer vessel which surrounds the inner vessel with a spaced relation in between to provide an intervening insulated space which is preferably, though not necessarily, maintained under vacuum. An insulation system composed of multiple layers of a low conductive material, with an occasional heat reflective barrier sheet, is disposed within the intervening space with the layers disposed generally parallel to the walls of the vessel so as to extend normal to the direction of heat flow between the walls.

A fluid conduit, in the form of a neck tube, extends vertically from the inner vessel through the top of the outer vessel for communication with the interior of the inner vessel for the passage of liquid and gases into and out of the container. In some containers, the neck tube serves to support the inner vessel while the insulation system provides lateral support, while in other containers, the neck tube does not serve to support the inner vessel but nevertheless is interconnected both with the inner vessel and the outer vessel.

In U.S. Pat. No. 3,272,374, issued Sept. 13, 1966, description is made of a means for mounting the neck tube with a pivoted swivel joint to minimize the effect of sudden deflection loads which might impose severe loading on the neck tube, especially when it is used to support the inner vessel. This is alleged to be achieved without objectionable increase in the heat inleak.

In U.S. Pat. No. 3,133,422, description is made of an insulation system of the type described in which heat inleak is reduced by the addition of heat conductive shields to the insulation layer and the reflective barriers, with the heat conductive shields being secured to the neck tube in good heat conductive relation so as to be able to conduct the heat, interrupted by the shield, to the neck tube.

For this purpose, axially spaced apart disc members are secured to the outer wall of the neck tube. The layers of insulation material, including the occasional radiant heat barrier layer are wrapped, preferably spirally, about the innermost vessel to a desired thickness, corresponding to the level of a first disc member. Thereafter a shield of conductive metal, such as copper or aluminum, is installed about the built-up insulation with an overlap onto the disc to which it is secured by a soldering or other metal bonding means to provide a connection of low thermal resistance or of high thermal conductivity for transfer of heat from the shield to the disc and neck tube. Thereafter, the operations are repeated serially until the insulation system with the heat conductive shields has been installed. This not only requires interruption of the winding operation to build up the insulation layers about the inner vessel for purposes of metal bonding the heat conductive shields to the disc plates, but the actual bonding operation is time consuming and difficult to achieve by reason of the limited access and the flexibility of the relatively thin metal members. In addition, such metal bonding at elevated temperature subjects the element, including the disc and the neck tube, to distortions which subsequently interfere with the utility of the insulated container and the useful life thereof and it is difficult to leak test the neck assembly after each disc has been applied, especially when the container is mounted on the wrapping machine.

In the construction described in the aforementioned patent, utilization is made of neck tubes of relatively thin metal members with the intent of reducing heat inleak, but at the expense of structural integrity and ability to sustain lateral impact loads, with the result that special and expensive procedures are required to improve the resistance of the container to such sudden deflection loads.

It is an object of this invention to produce an insulated container of the type described which is characterized by an improved neck tube construction and insulation system whereby the combination of thermal layers of thermal insulating material, reflective barrier sheets, and heat conductive shields can be applied in the desired sequence for disposition in the insulating space between the inner and outer vessels, in which the neck tube can be fabricated with the desired extension for installation into position of use to interconnect the inner and outer vessels thereby to avoid fabrication steps on the neck tube while in the assembled relation, in which means are provided to limit the relative turning movement between the inner container and neck tube and the supporting elements from the outer vessel, thereby to provide for greater stability and strength, and in which the neck tube is characterized by greater strength and stability whereby the resistance to sudden deflection loads can be markedly increased for greater utility of the insulated container.

These and other objects and advantages of this invention will hereinafter appear and for purposes of illustration, but not of limitation, an embodiment of the invention is shown in the accompanying drawings in which FIG. 1 is a schematic sectional elevational view of an insulated container embodying the features of this invention;

FIG. 2 is an enlarged sectional elevational view of a portion of the container, illustrating in greater detail the neck tube construction and insulation;

Figure 1:
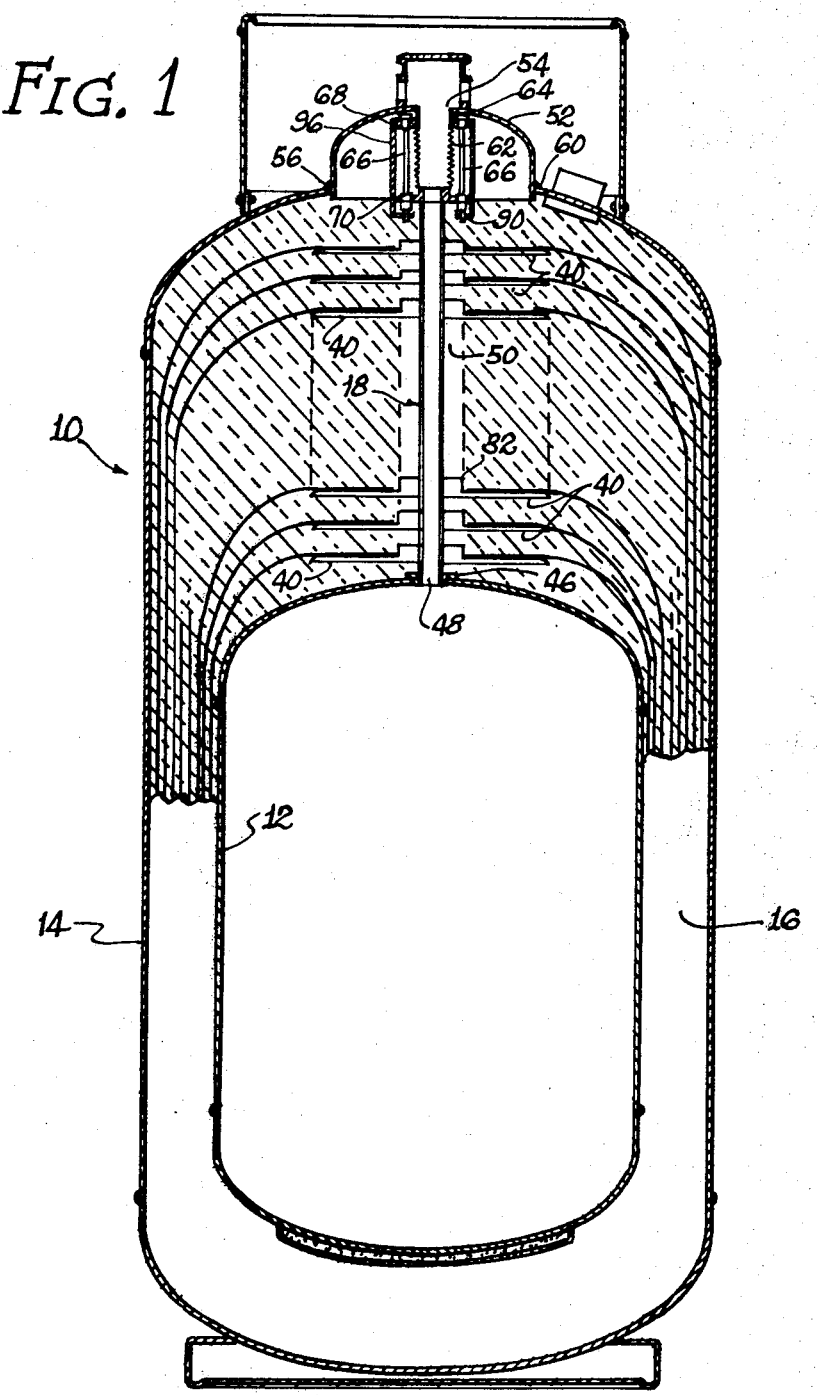

Referring now to the drawings, where like numerals represent like parts, the insulated container 10 is formed of an inner vessel 12 and an outer vessel 14 with an insulated space 16 in between, said space preferably being an evacuated space. The inner vessel is preferably supported by a hollow fluid conduit, hereinafter referred to as a neck tube 18, secured to the top of the inner vessel by means of an adaptor 20 for communicating the interior of the inner vessel with valve means (not shown) beyond the outer vessel.

The portion of the neck tube 18, disposed in the space between the inner and outer vessels, is provided with a plurality of ring members 32 of highly conductive material, which are joined to the outer wall of the neck tube portion in axially spaced apart relation. When the ring members are formed of a highly conductive metal, such as copper or aluminum, the metal ring members may be spun onto the neck tube prior to assembly, or the ring members can be provided in the form of metal disc members having a central opening corresponding to the outer wall to wall diameter of the neck tube and to which the ring members are secured by a metal bonding means, such as silver soldering 34 and the like, in the desired axially spaced apart relation. When the ring members and neck tube are formed of plastic, such as carbon filled plastic, ceramic filled plastic, or of such plastic materials as Teflon (tetrafluoroethylene) or Nylon (polyester) or the like, the neck tube and ring members can be molded as an integral unit.

The peripheral end portions of the ring members are turned to extend downwardly substantially perpendicularly to provide a short skirt 36 of cylindrical shape, preferably having openings to enable use of a pop rivet 38 for securing an annular flange 40, having a central opening 42 dimensioned to correspond to the diameter of the ring member 32, with an upturned portion 44 at the inner periphery which telescopes onto the skirt. The upturned flanged portion 44 is provided with aligned openings for enabling the rivet to extend therethrough to connect the flange 40 onto the ring 32. The flange 40 is split, as at 43, to facilitate mounting onto the ring 32. Instead of riveting the flange onto the ring, the flange can be secured to the ring by other fastening means, with the flange being dimensioned to extend horizontally outwardly for a distance beyond the ring members.

In assembly, the neck tube with the ring members 32 preassembled thereon, is joined via the adaptor 46 to the inner vessel, with the opening of the neck tube in communication with the inlet opening 48 through the inner vessel.

In this assembled relation, the inner container is mounted in the insulation fixture and the desired number of layers of insulating material and intermittent layers of heat reflecting barrier strips are applied, as by spiral winding, onto the inner vessel.

Thereafter the insulating operation is stopped and a flange member 40 is secured to the next adjacent ring member, and the heat conducting shield, such as 4 to 20 layers of aluminum foil, are applied, as by winding, onto the insulation to form layers which overlaps the outer portion of the flanged member 40 short of the ring 32. The application of the insulation layer and occasional reflective barrier sheet is repeated followed by attachment of the next flanged member and application of the heat conductive shield, until the insulation system has been built up in the insulated space.

An annular space 50 will exist between the neck tube 18 and the inner edge of the insulation wrapped about the flanged members 40 since the insulation and conductive sheets will be wrapped in a manner which may overlap the flange and a portion of the ring, with such wrapping usually terminating short of the neck tube.

The neck tube 18 is provided at its upper end, beyond the insulation, with means for attachment to the outer vessel, but in a manner which enables a limited amount of relative movement while maintaining a sealed relation for evacuation of the space in between. For this purpose, there is provided a dome cap 52 having an outlet opening 54 at the top and oftentimes a skirt portion 56 which is received in fitting relation in an opening through the top of the outer vessel 12 and to which it is secured in sealing relation, as by welding 60, whereby the interior of the dome communicates with the insulated space but is sealed from the atmosphere.

The neck tube 18 is joined to the dome by way of an expandable bellows 62 secured at its upper end to the dome member by a top neck flange 64 in the form of a sleeve member which is joined at its lower portion to the upper end of the bellows and at its upper portion to the domed member about the outlet opening 54, with a sealing relation between the top neck flange 64 and the dome member. A bottom neck flange 65 interconnects the lower end portion of the bellows 62 to the upper end portion of the neck tube 18, whereby the interior of the inner vessel communicates with the outlet in the dome via the aligned openings through the neck tube 18 and bellows 62, with the mounting flange members 64 and 65.

Means are provided to support the neck tube from the dome by a suspension which permits angular and turning movements as well as axial movement. In the illustrated modification, the neck tube 18 is supported from the sleeve 64 by way of a plurality of circumferentially spaced apart suspension rods 66 operatively engaged at their upper end portion by a horizontally disposed disc member 68 secured to the neck flange 64 for rigid attachment to the dome and which are pivotally attached at their lower end portion to another disc member 70 secured to the sleeve section 65 rigid with the lower end portion of the bellows 62 which, in turn, receives the upper end of the neck tube in sealing engagement. The rod members 66 can be fabricated of poor thermal insulating material, such as titanium, nylon, reinforced plastics, and the like.

To permit relative movement between the neck tube 18 and the dome support 52 via the bellows, the length of rods 66 is equal to and preferably shorter than the bellows 62. The disc members 68 and 70 are provided with vertically aligned openings 72 through which the rods extend with the through-extending portions having head sections 74 and 76 dimensioned to be greater than the openings 72, and bearing portions 78 and 80 immediately inwardly of the head portions 74 and 76, and which are dimensioned to be slightly less in crosswise dimension than the openings 72 and which are located within the openings in a manner to permit relative axial movements and limited play for relative angular movement. In the preferred embodiment, one or both of the through-extending end portions of the suspension rods can be threaded while the head member is in the form of a nut member in threaded engagement therewith to permit axial adjustment of the spaced relationship between the supporting upper and lower discs.

The head portion and the adjacent bearing portion at the opposite ends of the bearing rods are connected by a spindle portion 82 of considerably lesser cross section.

The disc members 68 and 70 are designed to enable insertion of the rod members into position of use. For this purpose, each of the disc members are formed with a central opening 84 for connection to the top and bottom neck flanges. A number of openings 72, corresponding to the number of suspension rods, are provided in circumferentially spaced apart relation a short distance inwardly from the periphery of the disc member with the openings dimensioned to be less than that of the head portions 74 and 76 but slightly larger than the bearing portions 78 and 80 of the rods. A radial slot 86 extends radially inwardly from the periphery to the opening with the slot dimensioned to have a width slightly greater than the width of the spindle portion 82 but less than the bearing portion to enable the rod to be inserted into the disc by radial displacement of the spindle portion through the slot to the opening and then axial displacement in the opening until the bearing portion is seated within the opening.

Though not essential, means are provided to restrict rotation of the inner vessel 12 relative to the outer vessel and dome support.

Figure 2A:
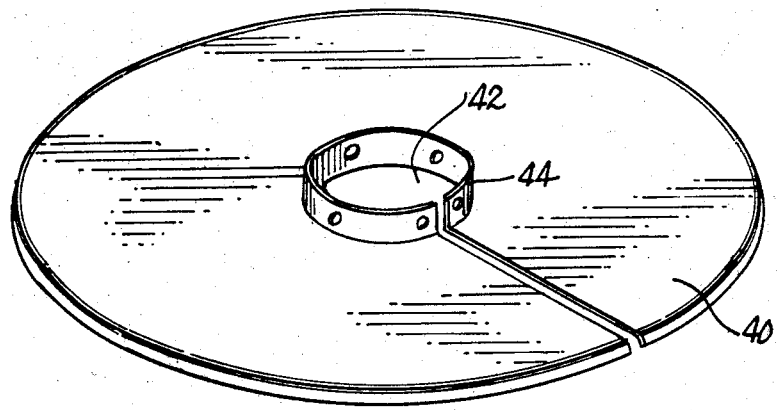
FIG. 2a is a perspective view of the split ring used in the neck tube assembly.
Figure 3:
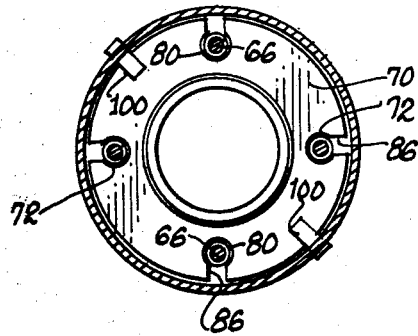
FIG. 3 is a top plan view of the elements forming a part of the neck tube construction for limiting relative rotational movement.
Figure 4:
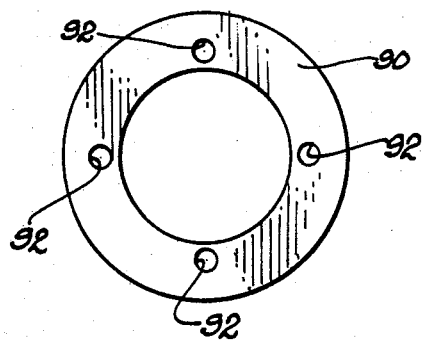
FIG. 4 is a top plan view of disc members employed in the support means for the neck tube.

As illustrated in FIGS. 2 and 4, a round disc plate 90 is provided with openings 92 extending therethrough, corresponding in number to the number of suspension rods 66 and on the same circle diameter, so that one opening 92 will be located in axial alignment with each rod. The rods 66 are dimensioned to have a length whereby a machined down end portion 94 extends through the aligned opening 92 in the disc 90, with a clearance therebetween which defines the maximum amount of relative movement between the rod 66 and the disc 90.

The outer periphery of the disc member 90 is fixed, as by welding, to the lower end portion of a tubular member 96, which, in turn, is fixed at its upper end portion to the disc member 68 and the sleeve 64 rigid with the dome 52 and the outer container 10. Thus the disc 90 is rigid with the outer container and the only rotational movement of which the neck bellows 62 is capable is defined by the clearance between the diameter of the openings 92 and the diameter of the through-extending end portion 94 of the rods 66.

Though not essential, it is often desirable to restrict vertical movement as well. For this purpose, as illustrated in FIGS. 2 and 4, block 100 is secured, as by welding, to the tubular member 96 in position to overhang the disc plate 70 in an area between the suspension rods 66. Disc plate 70, being fixed to the neck tube and the block 100 being fixed to the dome and outer container 14, relative vertical movement is restricted to the distance between the top of the disc plate 70 and the bottom of the overhanging block 100.

The described construction enables the use of a lesser number of heat conductive shields. This, in turn, enables the use of a shorter neck tube as well as a neck tube of greater wall thickness thereby to provide a structurally strong neck tube assembly which is capable of taking more load and more bend to withstand deflective loads which are many times greater than deflective loads capable of being withstood by prior constructions of the type described.

The amount of heat required to be intercepted by the heat shields by conductive conveyance to the neck tube is relatively minor, such that the contact achieved by merely wrapping the heat shield over a portion of the flanged member 40 is sufficient to obtain the desired flux in the insulation system. This, of course, minimizes the importance of the neck tube as a heat conductive member and therefore enables utilization of a shorter neck tube of greater wall thickness with the advantages as outlined above.

It will be understood that changes may be made in the details of construction, arrangement and operation, without departing from the spirit of the invention, especially as defined in the following claims.

I claim:

1. In a double walled liquefied gas container having an inner storage vessel with an opening at the top for access into the interior of the vessel, an outer shell substantially enclosing said inner vessel with an insulation space in between, a vertical neck tube connected at its lower end to the inner vessel about the opening for the transmission of liquid and vapor therethrough into and out of the vessel, the improvement comprising an outlet opening in the outer shell in substantial alignment with the opening in the inner vessel and means connecting the upper end of the neck tube with the outer shell for providing continuous communication between the opening in the inner vessel and the outer shell but in a manner to enable limited lengthwise and angular movements between the inner vessel and the outer shell comprising an elongate bellows having a passage extending continuously therethrough with the bellows connected at one end to the upper end of the neck tube and the bellows connected at its upper end to the shell, a disc member rigid with the upper end of the bellows and a second disc member rigid with the upper end of the neck tube, longitudinally aligned openings in the disc members, and connecting rods extending lengthwise between aligned openings of the disc members with adjustable stops for limiting relative movement between the disc members and the connecting rods.

2. A double walled container as claimed in claim 1 in which the rods and openings are circumferentially arranged in equally spaced apart relation about the neck tube and bellows and spaced a short distance radially outwardly therefrom.

3. A double walled container as claimed in claim 1 which includes a block rigidly interconnected to the shell and positioned a predetermined distance above said second disc member to limit movement of the neck tube and the attached inner vessel in the direction towards the outer shell.

4. A double walled container as claimed in claim 1 in which the connecting rods are formed with portions longitudinally spaced by an amount corresponding to the spaced relationship between the first and second disc members and dimensioned to correspond with the dimension of the respective openings through the disc members for sliding engagement therein.

5. A double walled container as claimed in claim 4 in which the connecting rods extend through the openings in said disc members and one end of each of said rods includes a head portion of larger dimension than said openings.

6. A double walled container as claimed in claim 5 in which the connecting rods are dimensioned to have a length greater than the distance between the disc members with other end of said rods being formed with a threaded portion threadably to receive an adjustable nut member having a cross sectional dimension greater than the dimension of said opening for adjustment of the length of the rod portion between the disc members.

7. A double walled container as claimed in claim 1 which includes means limiting relative rotational movement between the neck tube and attached inner vessel with the outer shell comprising a third disc member having openings therein and in spaced relation below the second disc member, the connecting rods having a length greater than the distance between the first and second disc members to provide a lower end portion which extends beyond the second disc member and into aligned openings of the third disc member, said rod portions extending into the aligned openings of the third disc member being dimensioned to have a cross section less than the dimension of the openings whereby relative rotational movement between the third disc member and rods is limited to the amount of play between the rods and the adjacent walls defining the openings.

8. A double walled container as claimed in claim 7 in which the openings in the third disc member are in longitudinal alignment with the connecting rods.

9. A double walled container as claimed in claim 7 in which the third disc member is spaced below the second disc member and is rigidly interconnected to the outer shell.

* * * * *

UNITED STATES PATENT OFFICE
CERTIFICATE OF CORRECTION

Patent No. 3,948,411    Dated April 6, 1976

Inventor(s) Rolland R. Conte

It is certified that error appears in the above-identified patent and that said Letters Patent are hereby corrected as shown below:

In the specification, column 3, line 63, to column 4, line 1, should read as follows:

4-20 layers of insulation are applied as by winding to form layers which overlap the outer portion of the flange member 40 short of the ring 32.

Signed and Sealed this

Twentieth Day of July 1976

[SEAL]

Attest:

RUTH C. MASON
Attesting Officer

C. MARSHALL DANN
Commissioner of Patents and Trademarks